(12) United States Patent
Grills

(10) Patent No.: US 6,201,846 B1
(45) Date of Patent: Mar. 13, 2001

(54) METHOD OF JACKETING

(75) Inventor: Raymond C. Grills, Seaford, DE (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 02/738,388

(22) Filed: Mar. 31, 1947

(51) Int. Cl.$^7$ ........................................................ G21C 3/04
(52) U.S. Cl. ............................... 376/261; 376/414; 427/6; 29/423
(58) Field of Search ............................ 204/154.2, 154 C, 204/159, 234, 193.234; 252/301.1; 250/83.6; 117/49, 51, 71, 113, 128; 206/84; 29/194, 503, 423, 424; 376/261, 414, 416, 417; 427/5, 6

(56) References Cited

U.S. PATENT DOCUMENTS

| | | | |
|---|---|---|---|
| 1,101,729 | * 6/1914 | Davis | 204/154.2 |
| 1,479,936 | * 1/1924 | Stevens | 18/59 SF |
| 1,692,818 | * 11/1928 | Christopf | 29/503 |
| 1,760,039 | * 5/1930 | Bundy | 29/503 |
| 2,310,834 | * 2/1943 | Bullock | 29/503 |
| 2,321,071 | * 6/1943 | Ehrhardt et al. | 29/503 |

* cited by examiner

Primary Examiner—Harvey E. Behrend
(74) Attorney, Agent, or Firm—Robert J. Fisher; Paul A. Gottlieb

(57) ABSTRACT

A method of jacketing a body of fissionable material within a nonfissionable jacket having a cup-shaped body open at one end and a cap effecting closure at said end comprising the steps of inserting the cup-shaped body into a tightly fitting cup-shaped sleeve; completely submerging said assembly in a bonding bath of a molten metallic bonding material, allowing the inner body to fill with molten bonding material; dipping the fissionable body into the open end of said assembly while under the surface of the bonding bath; closing the open end of the assembly with the cap while under the surface of the bonding bath; removing the complete assembly from the bonding bath; quenching in cold water; and removing the sleeve.

6 Claims, 1 Drawing Sheet

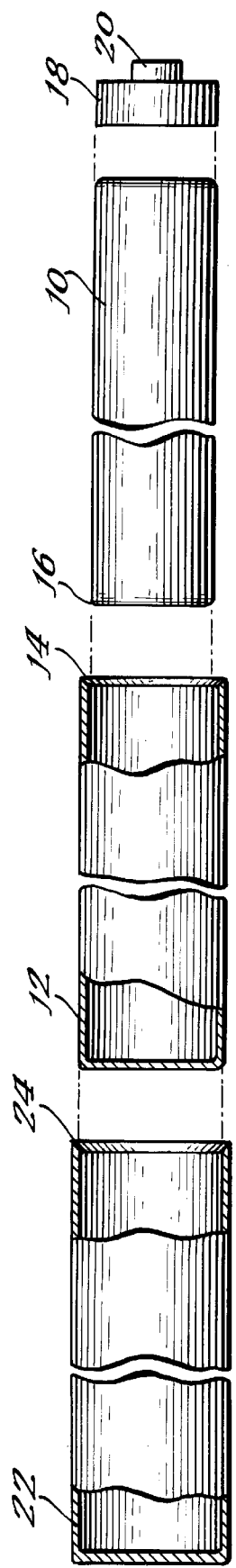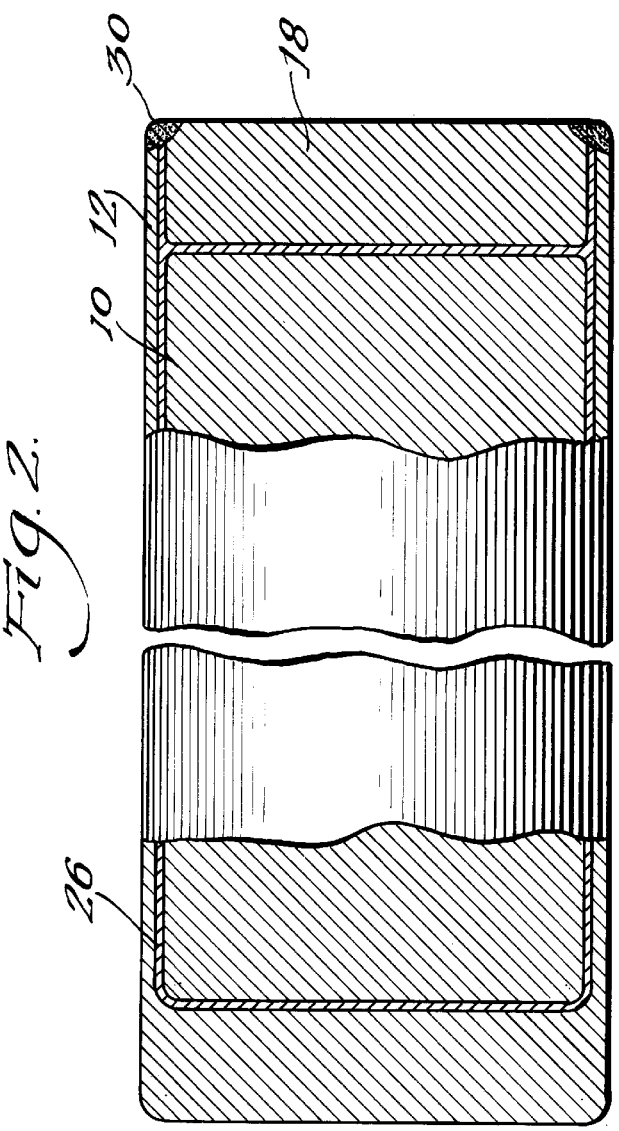

METHOD OF JACKETING

This invention relates to an improved method of jacketing bodies in pressure-tight jackets. More specifically, the invention relates to an improved method of jacketing a member comprising fissionable material within a jacket of nonfissionable material to form an assembly adapted for use in a neutronic reactor.

In a neutronic reactor, a fissionable material, such as uranium, is commonly encased or jacketed in a jacket of a material of high thermal conductivity. The jacket functions both to prevent corrosion of the fissionable material and to prevent the escape of radioactive substances, which are generated within the fissionable material during operation of the reactor, into portions of the reactor other than the fissionable material. For operation of a neutronic reactor at high temperatures, the body within the jacket is bonded to the inner surface of the jacket. This is necessary in order to secure adequate heat transfer to an exterior coolant from the fissionable material, within which great quantities of heat are produced in the operation of the reactor.

The fissionable members commonly employed in neutronic reactors are cylindrical in shape, usually of a diameter of the order of 1 inch and are of a length rendering them suitable for easy handling. Such fissionable elements are commonly called "slugs".

It has been found that with the methods heretofore used for making the unitary jacketed slug structure described above, there have frequently occurred faults in the bonding between the fissionable member and the jacket. At the points of occurrence of such faults, there have developed "hot spots", points of high temperature, which may cause the production of blistering, rupturing of the jacket, and other deleterious effects upon the jacketed slugs during high temperature operation of the neutronic reactor. The development of such defects during operation is extremely prejudicial, if not fatal, to the continued proper operation of the reactor.

Because of the factors discussed above, the quality and uniformity of the bond required between the fissionable member and the jacket must be perfect to a degree heretofore never required. The present invention is not directly concerned with the physical construction or the materials of the fissionable member, the jacket, or the bonding agent. It is the object of this invention to provide a method of assembling and bonding a jacketed slug of fissionable material wherein no air bubbles or other faults exist in the bond between the fissionable material and the jacket.

Generally, the object of this invention is accomplished by assembling the above-described assembly of fissionable member and jacket while these elements are submerged in a bath of the molten bonding material. For a better understanding of the invention, reference is made to the drawing, in which:

FIG. 1 is an exploded view, partially in elevation and partially in longitudinal section, of the parts of a jacketed fissionable slug made in accordance with this invention; and FIG. 2 is a longitudinal sectional view partly in elevation of a completed slug made in accordance with the teachings of this invention.

In FIG. 1, the cylindrical body 10 of uranium fits into the cup-shaped jacket 12 of aluminum. The jacket 12 may have, for example, a length of 9.5 inches, an outside diameter of 1.44 inches and an inside diameter of 1.368 inches, thus having a wall thickness of approximately 0.036 inches.

It is necessary that the wall thickness of the jacket 12 be kept relatively small because of the fact that the neutron absorption of the jacket, and thus the loss of neutrons to the chain reaction of the neutronic reactor, increases with the quantity of aluminum present. The fissionable body 10 of uranium or other fissionable material may be, for example, 8 inches in length and, for example, 1.360 inches in diameter. It will be seen that the clearance between the fissionable body 10 and the jacket 12 in the example given is extremely small, being approximately 0.004 inches. The jacket 12 is preferably chamfered at the mouth as at 14, and the fissionable member 10 is preferably bevelled slightly at the edges as at 16 to allow convenient fitting of the fissionable member 10 into the jacket 12. The end cap 18 has approximately the same diameter as the fissionable member 10, and preferably has an axial boss 20 on the outer surface thereof for convenient handling.

The elements described above and illustrated in the drawing do not in themselves constitute any portion of the present invention. In FIG. 1 there is illustrated, in addition to the elements already described, a cup-shaped sleeve 22 preferably of steel, into which the jacket 12 is designed to fit tightly. The sleeve 22 is likewise chamfered at its mouth as at 24 to facilitate insertion of the jacket 12 therein.

In the method of the present invention, the jacket 12 is first inserted into the sleeve 22, the bottom of jacket 12 then resting at the bottom of the sleeve 22. Preferably, a ball, for example of steel (not illustrated in the drawing) is then inserted into the mouth of the jacket 12. The ball is of larger diameter than the mouth of the jacket 12, and thus pressure applied to the ball has the effect of slightly flanging the mouth of the jacket 12 against the inner surface of the sleeve 22, and thus effectively sealing any clearance which may exist between the jacket 12 and the sleeve 22 from the molten bonding agent into which this assembly is subsequently plunged.

The assembly consisting of the jacket 12, slightly flanged at the mouth as described above, and the sleeve 22 is then plunged into a molten bath of an aluminum-silicon alloy. Preferably, the bath has a silicon content of 11.2 to 11.5 percent and has a temperature of 590 to 596° C. The materials, composition, and properties of the bath are not in themselves the invention of the present inventor. It will be understood further that the teachings of the present invention are not limited to the particular bonding agent employed, nor, indeed, to any particular configuration or materials for the jacketed slug.

Upon being plunged into the bath of bonding material, the jacket 12 fills with the bonding material, but its external surface does not come into contact with the bonding material because of the flanging above described. Thereupon, the uranium body 10, previously cleaned and prepared for bonding by methods which constitute no part of the present invention, is inserted into the jacket 12. Preferably, this operation is performed while the elements are completely submerged in the bath of molten bonding material. However, for convenience, the mouth of the jacket 12 encased in the sleeve 22 may be brought slightly above the surface of the bath in order that the end of the uranium body 10 may be successfully inserted into the mouth of the jacket 12, the material of the bonding bath being opaque. However, it is important that only a small portion of the uranium be inserted into the jacket before the whole assembly is plunged back into the bath, wherein the uranium body 10 is allowed to drop to the bottom of the jacket 12. Furthermore, if the mouth of the jacket 12 is so slightly withdrawn momentarily, the uranium body 10 should itself first be dipped into the bonding bath. As stated above, the preferable manner of performing the operation involves the insertion of the end of the body 10 into the jacket 12 while both elements are completely submerged. The procedure involving slight withdrawal of the mouth of the jacket 12 from the bath for purposes of visibility in commencing the insertion of the uranium body 10 has been found, however, to be permissible provided that it is done with great speed, and provided further that the uranium has first been wetted by the bonding agent by immediately previous dipping as above described. The uranium should be removed from the bath for such commencement of insertion simultaneously with the exposure of the mouth of the jacket.

Upon completion of the insertion of the uranium body 10 into the jacket 12, while the assembly remains submerged, the cap 18 is inserted, being held as by tongs gripping the boss 20. The assembled piece is then removed from the bath and transferred with tongs to a bath of cold flowing water in a quench tank until the molten bonding agent is solidified. The slug may then be removed from the sleeve 22 by merely inverting the latter, since the interfaces between the jacket 12 and the sleeve 22 have not been exposed to the bonding bath. Thereupon, the end cap 18 may be machined down in a lathe to remove the boss 20 and any bonding agent which has adhered to the outer face thereof. It will be seen that the sleeve 22 serves the four-fold function of holding the jacket in position for slug insertion, preventing the bonding agent from fouling the outside of the jacket, supporting the thin-walled jacket to prevent its deformation, and transferring heat from the molten bath to the jacket.

The method above described produces a unitary slug structure as illustrated in FIG. 2 of the drawing. It has been found that this method produces a bonding layer, designated by the numeral 26, which is completely free of faults caused by air gaps or impurities. The closure of the jacket may be further assured by the weld between the cap 18 and the jacket 12 at 30.

The teachings of this invention shall not be deemed to be limited to the exact embodiment illustrated in the drawing and described above. Equivalent methods utilizing the teachings of this invention will be devised by persons skilled in the art.

What is claimed is:

1. A method of jacketing a cylindrical body of uranium within an aluminum cylindrical jacket having a cup-shaped body having an open mouth at one end and a plug cap effecting closure at said end comprising the following steps: inserting the cup-shaped aluminum body into a tightly fitting cup-shaped steel sleeve coterminous therewith; flaring slightly the mouth of said cup-shaped body to seal the mouth of the body against the mouth of the sleeve by pressing a metal ball of larger diameter than said bodies into the concentric mouths and thereafter removing the ball; immersing said assembly in a molten bonding bath of aluminum silicon having a silicon content of 11.2 to 11.5 percent at 590–596° C., allowing the aluminum body to fill with molten bonding material; dipping the uranium into the bonding bath; inserting the uranium into the open end of said assembly while under the surface of the bonding bath; inserting the plug cap in the open end of the assembly while under the surface of the bonding bath; removing the complete assembly from the bonding bath; quenching in cold water; and removing the sleeve.

2. A method of jacketing a cylindrical body of fissionable material within a cylindrical aluminum jacket having a cup-shaped body having an open mouth at one end and a plug cap effecting closure at said end comprising the following steps: inserting the cup-shaped body into a tightly fitting cup-shaped sleeve coterminous therewith; flaring slightly the mouth of said cup-shaped body to seal the mouth of the body against the mouth of the sleeve by pressing a metal ball of larger diameter than said bodies into the concentric mouths and thereafter removing the ball; completely submerging said assembly in a molten bonding bath consisting of an alloy of aluminum and silicon, allowing the inner body to fill with molten bonding material; dipping the fissionable body into the bonding bath; inserting the fissionable body into the open end of said assembly while under the surface of the bonding bath; inserting the plug cap in the open end of the assembly while under the surface of the bonding bath; removing the complete assembly from the boding bath; quenching in cold water; and removing the sleeve.

3. A method of jacketing a body of fissionable material within a nonfissionable jacket having a cup-shaped body open at one end and a cap effecting closure at said end comprising the following steps: inserting the cup-shaped body into a tightly fitting cup-shaped sleeve; completely submerging said assembly in a bonding bath of a molten metallic bonding material, allowing the inner body to fill with molten bonding material; dipping the fissionable body into the bonding bath; inserting the fissionable body into the open end of said assembly while under the surface of the bonding bath; closing the open end of the assembly with the cap while under the surface of the bonding bath; removing the complete assembly from the bonding bath; quenching in cold water; and removing the sleeve.

4. In a process of jacketing a body of uranium within, and bonding said body to, an aluminum jacket, the steps of completely submerging the body and the jacket in a bath of molten bonding material consisting of an aluminum-silicon alloy having a silicon content of 11.2 to 11.5 percent at a temperature of 590–596° C., inserting the uranium body into the aluminum jacket, both of said elements being so submerged during substantially all of said insertion, withdrawing the assembly so made from the bath, and solidifying the molten bonding material.

5. In a process of jacketing a body of uranium within, and bonding said body to, an aluminum jacket, the steps of completely submerging the jacket and the body in a bath of molten bonding material consisting of an aluminum-silicon alloy, withdrawing the uranium body from the bath, substantially simultaneously withdrawing a small opening portion of the jacket from the bath to permit viewing thereof, immediately inserting a small portion of the end of the body into said opening, immediately thereafter completely submerging said body and jacket and completing the insertion of the body into the jacket, withdrawing the assembly so made from the bath, and solidifying the molten bonding material.

6. A method of jacketing a body of fissionable material within an aluminum jacket comprising the following steps: completely submerging a jacket, enclosed in a tightly fitting sleeve, the jacket having a flange sealing any clearance between the jacket and the sleeve, in a molten bath consisting of an alloy of aluminum and silicon; inserting the fissionable body into the jacket, said fissionable body and jacket being under the surface of the bath during substantially all of said insertion; removing the assembly from the bonding bath; solidifying the molten bonding material; and removing said sleeve.

* * * * *